Sept. 30, 1958 E. LAY 2,854,145
FILTER
Filed Feb. 25, 1957
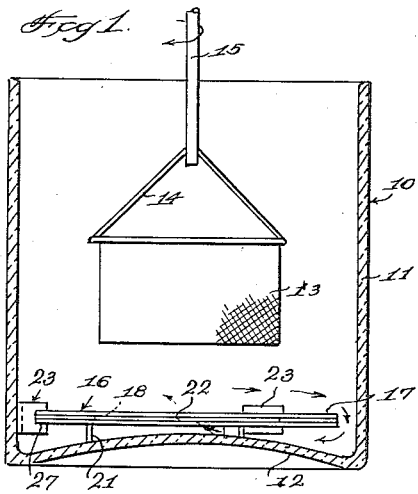
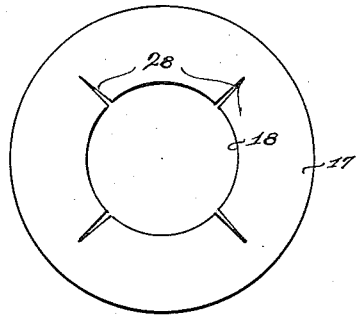
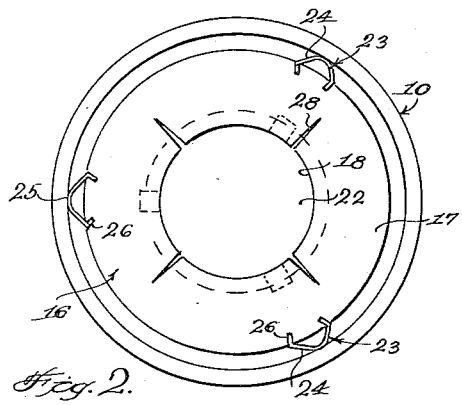
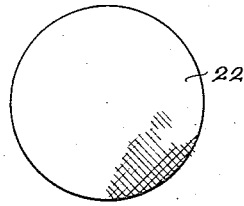
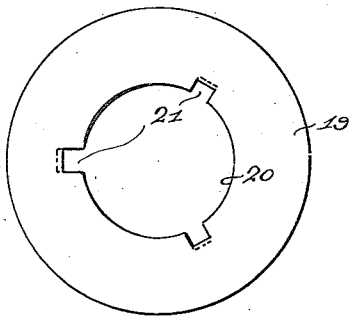
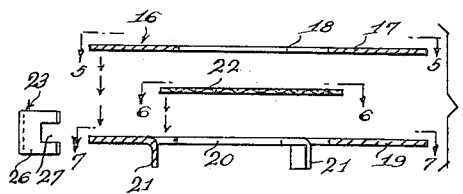
INVENTOR.
EUGENE LAY
BY *Victor J. Evans & Co.*
ATTORNEYS

United States Patent Office 2,854,145
Patented Sept. 30, 1958

2,854,145

FILTER

Eugene Lay, Marquette, Mich.

Application February 25, 1957, Serial No. 641,958

3 Claims. (Cl. 210—482)

This invention relates to a filter, and more particularly to a filter for use with cleaning fluid.

The object of the invention is to provide a filter which is adapted to be used with a rotating basket that is adapted to turn in a body of cleaning fluid so that dirt, foreign matter or the like will be trapped in the filter instead of entering the basket.

Another object of the invention is to provide a filter assembly which is especially suitable for use with apparatus that is adapted to be used for cleaning small articles or objects such as watchmaker's parts or equipment, whereby foreign matter will be filtered from the cleaning fluid whereby the foreign matter will be prevented from engaging or entering the basket that holds the articles being cleaned.

A further object of the invention is to provide a filter assembly which is extremely simple and inexpensive to manufacture.

Other objects and advantages will be apparent during the course of the following description.

In the accompanying drawings, forming a part of this application, and in which like numerals are used to designate like parts throughout the same.

Figure 1 is a vertical sectional view illustrating the filter of the present invention.

Figure 2 is a top plan view of the assembly shown in Figure 1, and with the basket removed.

Figure 3 is a plan view of one of the clips.

Figure 4 is a sectional view showing the parts of the filter disassembled.

Figure 5 is a sectional view taken on the line 5—5 of Figure 4.

Figure 6 is a sectional view taken on the line 6—6 of Figure 4.

Figure 7 is a sectional view taken on the line 7—7 of Figure 4.

Referring in detail to the drawings, the numeral 10 indicates a hollow container which is adapted to hold a quantity of cleaning fluid, and the container 10 includes a cylindrical or annular side wall 11 and a bottom wall 12, Figure 1. Positioned within the container 10 is a rotary basket 13 which is adapted to hold the articles which are being cleaned, and such articles may be parts of watches or the like. The articles in the basket 13 are adapted to be cleaned by means of a solution or fluid which is arranged in the stationary container 10. Extending upwardly and inwardly from the basket 13 are support members 14 which are secured to the lower end of a rotary shaft 15, and the shaft 15 is adapted to be connected to any suitable power mechanism such as a motor so that by rotating the shaft 15, the basket 13 will be rotated.

Positioned within the lower portion of the container 10 and arranged below the basket 13 is a filter assembly which is indicated generally by the numeral 16.

The filter assembly 16 includes an upper plate 17 of circular shape, and the plate 17 is provided with a central circular opening 18.

The filter assembly 16 further includes a lower plate 19 of circular shape, and the plate 19 is provided with a central circular opening 20 which registers with the opening 18. Depending from the plate 19 and secured thereto or formed integral therewith, is a plurality of spaced apart legs 21, and the legs 21 engage the upper surface of the bottom wall 12 so as to maintain the filter 16 spaced above the bottom wall 12 of the container. As shown in Figure 1, the outside diameter of the plates 17 and 19 is slightly less than the diameter of the wall 11 so that a space is provided between the outer periphery of the plates and the wall 11 whereby cleaning fluid can pass therethrough, as indicated by the arrows in Figure 1. Interposed or positioned between the upper plate 17 and the lower plate 19 is a disc or filter member 22 which may be made of a suitable reticulated material or the like. Thus, any foreign matter which accumulates in the cleaning fluid will be trapped in the filter 22 rather than being permitted to pass into the basket 13.

There is further provided a means for maintaining the parts of the filter 16 in assembled relation, and this means comprises a plurality of spaced apart clips which are each indicated generally by the numeral 23, Figure 3. Each clip 23 includes angularly arranged portions 24 which define a corner section 25 that is adapted to engage the inner surface of the wall 11, and each clip 23 further includes leg portions 26 which are provided with slots 27 for snugly receiving therein the outer edge portions of the plates 17 and 19 as shown in Figure 1.

The upper plate 17 is provided with a plurality of slits or cutouts 28 whereby warping of the upper plate 17 is prevented.

From the foregoing, it is apparent that there has been provided a filter assembly which is especially suitable for use with containers of cleaning fluid as shown in Figure 1. In use, the container 10 is adapted to hold a quantity of cleaning fluid, and the rotary basket 13 may hold articles to be cleaned which may be parts or pieces of watches or other jewelry or other articles which are to be cleaned by the solution or fluid in the container 10. The filter 16 is positioned in the bottom of the container 10, and the basket 13 is adapted to be rotated by means of the shaft 15, the shaft 15 being driven by means of a suitable motor. Thus, it will be seen that as the basket 13 rotates, the articles within the basket 13 will be thoroughly cleaned by the fluid in the container 10. Furthermore, due to the provision of the filter 16, any foreign matter such as dirt or the like which may be present in the container will be trapped in the filter disc 22 instead of clogging up the basket 13.

While the present invention has been described in connection with the cleaning of watch parts, it is to be understood that it has general utility and can be used for cleaning any desired articles. By means of the filter 16, the cleaning solution in the container 10 will remain translucent since any foreign matter or dirt in the solution is removed by means of the filter disc 22. Since the filter disc 22 quickly removes the foreign matter from the area around the spinning basket 13, the foreign matter is not beaten up or broken down into small particles which would have a tendency to cloud the solution before it loses its chemical cleaning strength. As shown in Figure 5, the upper plate 17 is provided with a plurality of slits 28 so as to prevent any warping of the plates when the filter member 22 is positioned between these plates.

The present invention is especially suitable for use in the watch making industry or trade. Heretofore watchmakers have been troubled with dirt, lint, and other foreign matter which accumulates in the cleaning jars of the cleaning machines and often many gallons or quantities of solution have had to be discarded because the solution was dirty and because the solution contained foreign matter, but not because the solution had lost its strength. The filter assembly of the present invention is extremely simple and inexpensive to make.

Watch cleaning machines usually include three jars which consist of wide mouthed cylindrical containers with flat bottoms, and watch parts are placed in a basket such as the basket 13 which is driven by a motor that is connected to the shaft 15. Thus, the basket 13 is spun in a first cleaner, and then the articles are rinsed, and finally dried. As dirt accumulates in the solution, and in particular in the cleaner, the dirt tends to get back into the basket 13 and become trapped in the corners and in the milled parts of the watch which must be watched for closely and brushed out since if these particles are not removed, they may cause trouble and make recleaning necessary. The parts of the present invention can be made of any suitable material and in any desired shape or size.

The filter 16 is constructed so that it readily fits in the jar or container 10 and yet does not interfere with rotation of the revolving basket 13. The plates 17 and 19 may be made of any suitable material such as a suitable metal such as tin, and these plates 17 and 19 are provided with central circular openings. The lower plate 19 has the struckout portions which define the downwardly extending legs 21 so that the plate 19 will not rest on the bottom of the jar or container. The clips 23 are provided with the slots 27, while the filter member 22 may be made of any suitable material such as cloth or the like.

In assembling the filter 16, the filter member 22 is positioned between the plates 17 and 19 and then the clips 23 are mounted in place so that the clips 23 clamp the parts of the filter together. The assembled filter is then placed in the cleaning jar with the legs down and the clips are bent or arranged at such an angle so as to bind on the side of the jar when they are inserted. Thus, the clips 23 are compressible so that when they are placed against the inside of the jar, the clips provide sufficient friction to prevent rattling of the parts and also prevent any tendency of the parts from rising up from fluid pressure underneath.

Since the plates or discs 17 and 19 are made smaller than the inside diameter of the container or jar 10, there is a clearance between the bottom of the jar and the filter. Thus, filtering action takes place, because of centrifugal action of the fluid. When the basket 13 spins, action is created forcing the fluid to the outside and causing a vortex in the center. The filter discs or plates 17 and 19 act as baffles to any whirling action under and between the bottom of the jar. Since the fluid is forced to the outside and there is a vortex in the center, the fluid flows down over the outer periphery of the plate and rushes back under the filter to the vortex where the filter material 22 is placed. Fluid passes through the filter 22 but any dirt particles are stopped. Because of equal pressure on all sides of the jar, and the vortex suction, any dirt particles not sticking to the filter material 22 falls to the bottom of the jar and piles up in the center and remains there. All of the foreign particles will be collected under the filter 16 so as to leave the basket 13 free to rotate in clean solution. There is such a large flow of fluid upwardly through the filter 16 that the clips 23 are necessary to provide the required tension to hold the device down in the container.

I claim:

1. In combination, a hollow container holding a quantity of fluid, and said container including a bottom wall and an annular side wall, and a filter assembly positioned in the lower portion of said container, said filter assembly comprising a lower circular plate provided with a central circular opening, a plurality of spaced apart legs depending from said plate for engaging the bottom wall of the container, an upper plate arranged above said lower plate and provided with a central opening therein, a filter disc interposed between said upper and lower plates, and a plurality of spaced apart clips engaging the outer portions of said plates for maintaining said filter assembled in the bottom of the container.

2. In combination, a hollow container holding a quantity of fluid, and said container including a bottom wall and an annular side wall, and a filter assembly positioned in the lower portion of said container, said filter assembly comprising a lower circular plate provided with a central circular opening, a plurality of spaced apart legs depending from said plate for engaging the bottom wall of the container, an upper plate arranged above said lower plate and provided with a central opening therein, a filter disc interposed between said upper and lower plates, and a plurality of spaced apart clips engaging the outer portions of said plates for maintaining said filter assembled in the bottom of the container, each of said clips being compressible and each clip including angularly arranged portions and a corner section, said corner section frictionally engaging the inner surface of the side wall of the container, there being slots in said clips for snugly receiving outer portions of said plates, the outer diameter of said plates being less than the diameter of said side wall.

3. A filter assembly for use in a container of cleaning solution, comprising a lower circular plate provided with a central circular opening, a plurality of spaced apart legs depending from said plate contiguous with the opening therein and said legs space said filter from said container, an upper plate arranged above said lower plate and provided with a central opening therein, said upper plate having radially disposed slots contiguous with the opening therein, a filter disc interposed between said upper and lower plates, a plurality of spaced apart clips engaging the outer portions of said plates for maintaining said filter assembled, each of said clips being compressible and each clip including angularly arranged portions and a corner section, there being slots in said clips for snugly receiving outer portions of said plates.

References Cited in the file of this patent

UNITED STATES PATENTS

| 1,218,620 | Benson | Mar. 13, 1917 |
| 1,329,398 | Hachmann | Feb. 3, 1920 |
| 2,081,636 | Minors | May 25, 1937 |
| 2,602,978 | Clark | July 15, 1952 |
| 2,760,674 | Karp | Aug. 28, 1956 |
| 2,803,050 | Fernberg | Aug. 20, 1957 |

FOREIGN PATENTS

| 456,859 | Great Britain | Nov. 17, 1936 |
| 576,707 | Great Britain | Apr. 16, 1946 |